US008460548B2

(12) United States Patent
Baxi

(10) Patent No.: US 8,460,548 B2
(45) Date of Patent: Jun. 11, 2013

(54) ROTATING BIOLOGICAL CONTACTOR APPARATUS AND METHOD

(75) Inventor: Indra R. Baxi, Troy, MI (US)

(73) Assignee: Biomass Technologies, LLC, Farmington, MI (US)

( * ) Notice: Subject to any disclaimer, the term of this patent is extended or adjusted under 35 U.S.C. 154(b) by 258 days.

(21) Appl. No.: 12/970,055

(22) Filed: Dec. 16, 2010

(65) Prior Publication Data

US 2012/0152833 A1  Jun. 21, 2012

(51) Int. Cl.
*C02F 3/08* (2006.01)

(52) U.S. Cl.
CPC .................................. *C02F 3/082* (2013.01)
USPC ........................... 210/619; 210/150; 210/232

(58) Field of Classification Search
USPC .................. 210/150, 151, 619, 232
See application file for complete search history.

(56) References Cited

U.S. PATENT DOCUMENTS

| | | | |
|---|---|---|---|
| 1,811,181 A | 6/1931 | Malby |
| 1,947,777 A | 2/1934 | Huff et al. |
| 3,630,366 A | 12/1971 | Joost |
| 3,645,510 A | 2/1972 | Klugman |
| 3,704,783 A | 12/1972 | Antonie |
| 3,904,525 A | 9/1975 | Rosenberg |
| 4,115,268 A | 9/1978 | Thissen |
| 4,137,172 A | 1/1979 | Sako et al. |
| 4,275,019 A | 6/1981 | Bednarski |
| 4,289,626 A | 9/1981 | Knopp et al. |
| 4,330,408 A | 5/1982 | McClure |
| 4,345,997 A | 8/1982 | McConnell, Jr. et al. |
| 4,385,987 A | 5/1983 | McGinley et al. |
| 4,431,537 A | 2/1984 | Hirota |
| 4,444,658 A | 4/1984 | Hankes et al. |
| 4,537,678 A | 8/1985 | Thissen |
| 4,549,962 A | 10/1985 | Koelsch |
| 4,563,282 A | 1/1986 | Wittmann et al. |
| 4,568,457 A | 2/1986 | Sullivan |
| 4,604,206 A | 8/1986 | Sullivan |
| 4,668,387 A | 5/1987 | Davie et al. |
| 4,692,250 A | 9/1987 | Miller |
| 4,721,570 A | 1/1988 | Ankaitis |
| 4,724,593 A | 2/1988 | Lang |

(Continued)

OTHER PUBLICATIONS

International Search Report and Written Opinion; Application No. PCT/US 11/63248; dated mailed Apr. 23, 2012.

(Continued)

*Primary Examiner* — Christopher Upton
(74) *Attorney, Agent, or Firm* — Brooks Kushman P.C.

(57) ABSTRACT

A wastewater treatment facility with a rotating biological contactor ("RBC") system. The RBC sits in a tank that receives wastewater to be purified. The tank supports a rotatable shaft. One or more stages of rotating disk assembles progressively purify incoming wastewater. Each stage is oriented transversely to the shaft and has a plurality of disk assemblies. Each disk assembly has a number of disks. Each of the disks comprises multiple concentric arcuate segments. The segments are provided with two generally radially extending edges, two circumferential edges that extend between the two radially extending legs, and a front face and a back face. Posts extend from the front and back faces of the disks for stirring wastewater and for offering a site for adherence of biomass suspended in the wastewater. Connecting members interconnect adjacent disks and optionally define a flow channel therebetween. First and second engagement features also extend from one of the front and back surfaces of a disk that enable adjacent segments of a disk to be joined.

16 Claims, 7 Drawing Sheets

U.S. PATENT DOCUMENTS

| | | |
|---|---|---|
| 4,729,828 A | 3/1988 | Miller |
| 4,737,278 A | 4/1988 | Miller |
| 5,227,055 A | 7/1993 | Timmons |
| 5,281,335 A | 1/1994 | Kuhn |
| 5,326,459 A | 7/1994 | Hlavach et al. |
| 5,395,529 A | 3/1995 | Butler |
| 5,401,398 A | 3/1995 | McManus |
| 5,407,578 A | 4/1995 | Nathwani |
| 5,419,831 A | 5/1995 | Fuerst et al. |
| 5,423,978 A | 6/1995 | Snyder et al. |
| 5,458,817 A | 10/1995 | Lang |
| 5,498,376 A | 3/1996 | St. Louis et al. |
| 5,637,263 A | 6/1997 | Lang et al. |
| 5,679,253 A | 10/1997 | Fuerst et al. |
| 5,714,097 A | 2/1998 | St. Louis et al. |
| 5,851,636 A | 12/1998 | Lang et al. |
| 5,853,591 A | 12/1998 | Snyder et al. |
| 6,071,593 A | 6/2000 | Lang et al. |
| 6,241,222 B1 | 6/2001 | Lang |
| 6,403,366 B1 | 6/2002 | Kim |
| 6,540,920 B2 | 4/2003 | Bounds et al. |
| 6,783,669 B1 | 8/2004 | Okagawa et al. |
| 7,083,720 B2 | 8/2006 | Miller |
| 7,156,986 B2 | 1/2007 | Warrow |
| 7,811,449 B2 * | 10/2010 | Warrow .............. 210/151 |
| 2005/0133444 A1 | 6/2005 | Warrow |
| 2007/0231219 A1 | 10/2007 | Warrow et al. |
| 2008/0053880 A1 | 3/2008 | Miller |
| 2008/0210610 A1 | 9/2008 | Whiteman |
| 2009/0250386 A1 | 10/2009 | Mayrand |
| 2010/0282654 A1 | 11/2010 | Hauschild |

OTHER PUBLICATIONS

US Filter; "Applying the Rotating Biological Contactor Process"; (1998); Bulletin No. USF 315-13A6 Cortez (p. 172), supra, published Jan. 24, 2008.

S. Cortez, R Teixeira, R. Oliveira, M. Mota, Rotating biological contactors: a review on main factors affecting performance, Rev Environ Sci Biotechnol (2008) 7:155-172.

International Preliminary Report on Patentability; International application No. PCT/US11/63248; date of mailing Dec. 18, 2012.

* cited by examiner

ROTATING BIOLOGICAL CONTACTOR APPARATUS AND METHOD

TECHNICAL FIELD

The disclosure relates generally to rotating biological contactors and methods of deploying them in a wastewater treatment facility.

BACKGROUND

Conventionally, raw sewage enters a wastewater treatment facility through an inlet pipe. An equalization tank or its equivalent may contain miscellaneous debris together with a sewage screen, grit chamber, and a waterwheel for transporting flow to a primary settling tank. The waterwheel may be driven by a shaft that is coupled to a rotating biological contactor ("RBC").

The RBC typically has one or more banks of circular media ("disks") that are supported by the shaft. Banks of disks are then rotated by the shaft, which may also be propelled by an electric motor, speed reducer and/or an inverter.

About forty percent of the surface area of the disks is submerged in the wastewater. As the media rotate into and out of the wastewater, microorganisms attach themselves to the media. Such microorganisms proliferate when exposed to, for example, ambient oxygen. Often, a system's capacity to treat wastewater is a function of the surface area of reaction products ("biomass") thereby formed. As used herein, the term "biomass" means any organic source of energy that is renewable. Typically, contaminates contained in the wastewater include organic compounds such as hydrogen, carbon and oxygen that combine to form numerous other compounds. The microorganisms that consume the most common contaminates attach themselves to the media before multiplying to form a biomass in the form of a film.

Continuous rotation of disks in an RBC system provides the aeration and mixing necessary for treating wastewater. From the atmosphere, oxygen may be transferred by (1) absorption through a liquid film that flows over a disk surface; (2) direct oxygen transfer at an air/reactor liquid interface through turbulence created by rotating disks; and (3) direct oxygen absorption by microorganisms when exposed to the air.

A useful discussion of related technology is found in S. Cortez et al., "ROTATING BIOLOGICAL CONTACTORS: A REVIEW OF MAIN FACTORS AFFECTING PERFORMANCE", Rev. Environ. Sci. Biotechnol. 7:155-172 (2008), which is incorporated herein by reference.

In some cases, an RBC may have multiple stages ("media assemblies").

Traditionally, in a first stage, the media surface area is presented to incoming wastewater, including microorganisms that naturally occur therein. As the disks rotate, the biofilm is formed on their surfaces. The biofilm metabolizes organic materials contained in the wastewater. In aerobic processes, rotating media promote oxygen transfer and maintain the biomass. Rotation also creates turbulence and enables excess solids to be removed or sloughed off from the media.

The microorganisms in typical wastewater normally form a microbial biofilm that grows over carrier material which is deployed in the disk bank(s) of the RBC. The media rotate at a speed of, for example, 1 to 5 RPM over a nearly stagnant bulk of sewer water and air. In operation, the film grows typically to a thickness of about 1-4 mm. When this occurs, the microorganisms that were the first to attach to the media die because no nutrient or oxygen can reach them. When this occurs over a large enough area, the biomass detaches itself from the media and sloughs off.

Media in use today typically include nested planar surfaces that are either flat or folded. They may, for example, be made of a mesh or a solid sheet. In known media assemblies, there is often a separation between adjacent disks. Extending from one side of conventional disks are projections that further engage the biomass. Both the flat and the folded types of media are spaced to provide a path that allows the sloughed biomass (i.e., biomass that has become detached from the media) to be washed out of the media. This is needed to prevent plugging of the system which would reduce the media surface area exposed to contaminates in the wastewater and thus reduce the capacity of the system. Following traditional approaches, biomass interposed between adjacent disks may result in uneven spacing and the distortion of media surfaces. Such uneven spacing may produce clogging. In turn, this reduces the effectiveness of treatment and may weaken the disks that form the media.

Some media have variously shaped holes or open triangles that increase the surface area. However it is difficult using traditional methods to make a large section (e.g., 10 feet in diameter) and keep a flexible disk straight during assembly. Such components become expensive to produce, and generally have a shorter running life due to cracking and breaking.

In some prior art approaches, media growth of the biomass on some sections produces non uniform loading. This causes the media to exert a rotational torque that is higher than may be designed or desirable. Fracture of the shaft that carries the disk media often results and/or the media themselves may fracture. Moreover, prior art media often do not provide additional oxygen that is needed for biomass growth and survival to reduce sludge. Thus, prior art rotating media banks tend to collapse due to an imbalance of heavy buildup.

Other disadvantages of conventional RBCs are numerous. From a process performance perspective, conventional RBCs have a limited oxygenation capacity. Because slowly rotating media are forty percent immersed in the wastewater, a "dead zone" exists near the center shaft. Solids accumulate near the center shaft because radial velocities are minimal, and the area is subject to little water scouring. Hence, traditional RBCs often fail to perform to the specifications of the original design. As noted above, the media have experienced problems of collapsing due to the weight of the solids build-up and retention. Additionally, many problems have been realized in the failure of the plastic media sheets to bond to the center shaft with which they rotate. Shaft problems have been experienced where the shaft shears under the load of excessive solids retained by the media. Because of this anticipated excessive loading, bearing problems have also been realized.

U.S. Pat. No. 7,156,986 is incorporated by reference. It discloses a pin and cone approach to spacing the media. However conical sections with long pins are difficult to manufacture economically. They are more rigid and can break (fail) during assembly. US Publication No. 2007/0231219 discloses double-sided self-cleansing media. The assembly includes a pin and hole arrangement. It is cumbersome to form a circular section. It is also difficult to cut periphery into a circular section That publication also is incorporated herein by reference.

It would be desirable to augment the capacity of such treatment facilities without excessive cost and without impairing the effluent quality.

SUMMARY

In light of such previous approaches, needs exist for new and improved disk media with balanced rotational motion and circulation of water. This is achieved in part through turbulating posts that extend from opposite sides of disks more effective surface area and methods of fastening disks together for long term reliable operation for use with RBCs and the like. The media do not require any metal or additional non-metallic component to form a full circle as the inventive snap device is self-supporting and forms complete circles of various diameters.

One embodiment of the disclosure utilizes precisely designed circular pins ("turbulating posts") in large numbers. Tall circular pins, optionally with a hollow inner core, augment the effective surface area. As a result, the film is broken and more water may flow to the next media bank or stage.

A multi-height feature of the media allows the biomass to accrete during rotation. This also facilitates self-cleaning and increased oxygenation. Moreover, the hollow pin media allow the heavy build up of biomass to fall.

The media can be made from such materials as UV stabilized filled polyethylene or UV stabilized filled and unfilled polypropylene and high density polyethylene.

In one embodiment, there is a snap fitting engagement of media segments to hold segments in place that are associated with a particular disk. First (e.g., male) and second (e.g., female) snap-fitting features link adjacent segments in a disk.

A plastic semi cylindrical tank may be provided beneath an assembly of disks. It is preferably made of fiberglass in a vacuum form process, or by a fiber glass layup process, or high density polyethylene rotational molding, or a sheet forming process.

The formed circular disks are precisely spaced apart to enhance movement of wastewater and biomass holding, plus allow the biomass to be dumped once a certain weight is built up.

The media are spaced along a center shaft and are supported with durable bearing supports. Thus they are not subject to shaft breakage in normal use. The incorporation of precisely designed pins and spacing eliminates a dead zone proximate the center of rotation, and allows oxygen to penetrate close to the inner center of the media, outside the central shaft.

The inventive media have several characteristics that offer improved performance over conventional sheet media. In alternative embodiments, there are octagonal wheels and circular structures that are non-corrosive due to their construction materials. One embodiment has paddles ("cups" or "scoops") that are optionally adjustable and positioned at the ends of spokes of the wheels. The paddles allow the media to trap air as the paddles enter the fluid during their rotational path. Somewhere toward the bottom of their rotational path, the paddles release the trapped air, which promotes oxygenation of the effluent.

While the media continue on their rotational path in an upward direction, their pin-shaped surfaces lift the liquid above the mean level of the wastewater. At some point toward the apex of their rotational path, the large and small circular pins allow the biomass to form and fall therebetween and thus promote efficient operation.

In alternative embodiments, the media are spaced to avoid collapse, using light flexible pins and snap studs. Optionally, the disclosed media pins are hollow axially, thereby allowing water to pass through small holes that create a balance in the rotary motion and provide rotational momentum.

Thus, an object of one embodiment of the disclosure is to provide improved circular media with various diameters.

Another object is to provide improved media pins to increase the surface area, reduce weight of disk banks and allow hanging biomass to fall into a collection tank.

Yet another object is to provide an improved pin design to increase surface area and (optionally) water flow through axial passages.

A further object is to provide snap fit engagement between adjacent segments in a disk and scoops to enhance air supply to the biomass.

A still further object is to provide pins on both sides of a disk that connect a small pin to a large pin to form a fixed distance between each disk.

A still yet further object is to provide disks with optionally removable segments that can replace existing media, are simple in construction, economical to manufacture and efficient to use.

With the above and other objects in view, the disclosure includes a combination and arrangement of parts hereinafter more fully described, illustrated in the accompanying drawings and more particularly pointed out in the appended claims. It is to be understood that changes may be made in the form, size, proportions and minor details of construction without departing from the spirit or sacrificing any of the advantages of the disclosure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the claims.

BRIEF DESCRIPTION OF THE DRAWINGS

The present disclosure will become more fully understood from the detailed description and the accompanying drawings, wherein.

The same reference numerals refer to the same parts in the various Figures.

DETAILED DESCRIPTION

The disclosure relates to new and improved media and systems incorporating them for use in conjunction with a rotating biological contactor system ("RBC") in a wastewater treatment facility.

Figure 1:
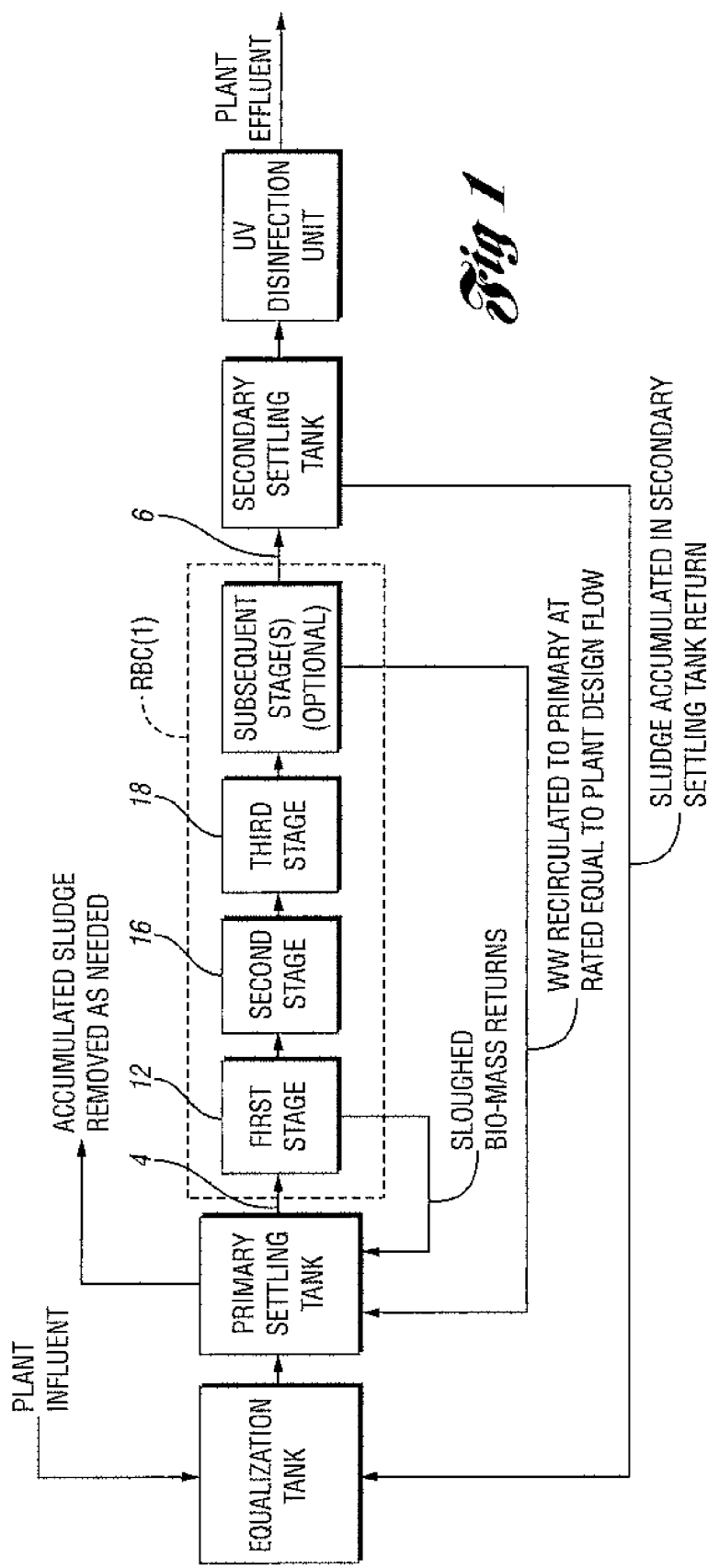
FIG. 1 is a schematic view of a wastewater treatment process.

To put the inventive RBC in context, a brief discussion now ensues about an exemplary wastewater treatment system, in which one embodiment of the disclosed RBC lies. In one form, a wastewater system (FIG. 1) has an equalization tank into which raw sewage including contaminants enters through an inlet pipe. Optionally, the equalization tank may include a mechanical sewage screen and a grit chamber, plus a waterwheel for transferring flow to a primary settling tank. In some cases, the waterwheel is driven by a linkage that is coupled to one end of an RBC shaft. The primary settling tank and a secondary settling tank located downstream from the RBC both provide storage for accumulated sludge. In a facility, there may be multiple RBC's.

As depicted in FIGS. 1-4, the RBC has in one embodiment three stages, although the invention is not so limited.

In accordance with a first embodiment of the present invention, an RBC system 1 is provided in a wastewater treatment facility. One embodiment has:
  a. an elongate tank 2 with a longtitudinal axis (X-X) and a lateral axis (Y-Y, FIG. 3);
  b. a rotatable shaft 8 that lies substantially parallel with the longtitudinal axis (X-X);
  c. one or more stages 12, 16, 18 for progressively purifying incoming wastewater, each stage being oriented transversely to the shaft 8 in approximate parallel relationship with the lateral axis (Y-Y). Each stage has one or more disk assemblies.

Figure 3:
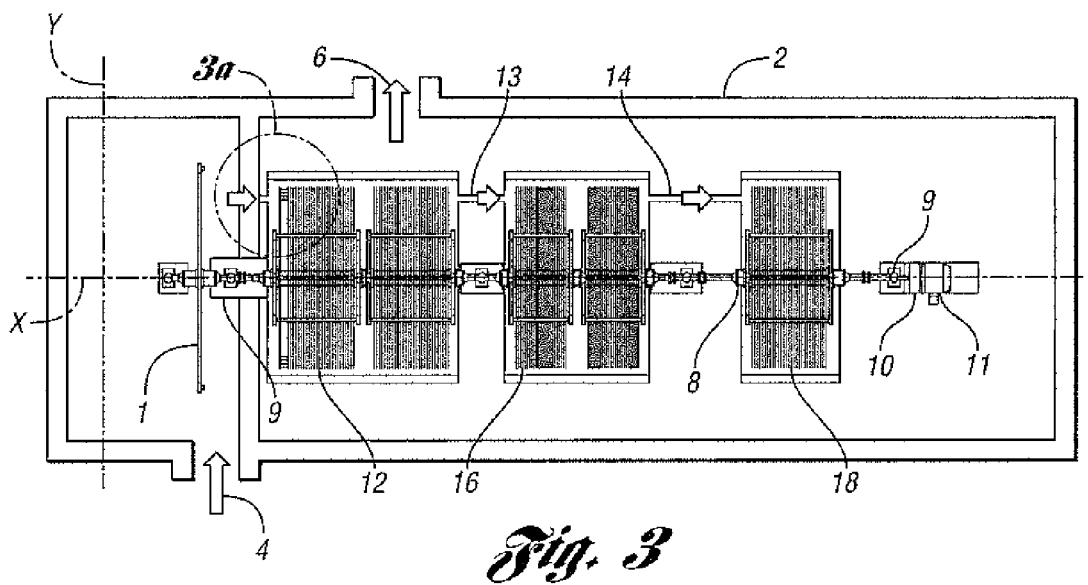
FIG. 3 is a top view thereof.
Figure 3A:
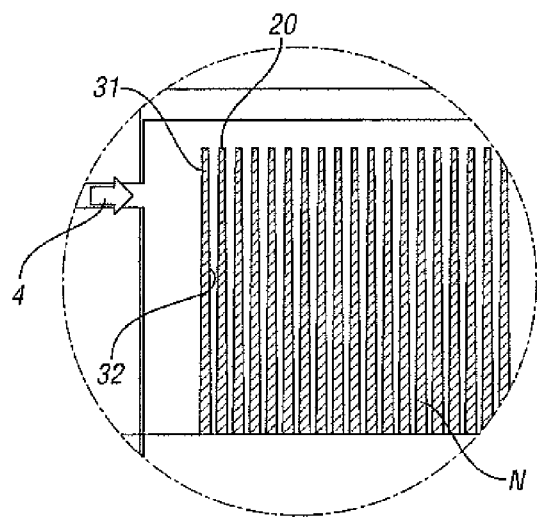
FIG. 3a enlarges a portion of it.
Figure 5:
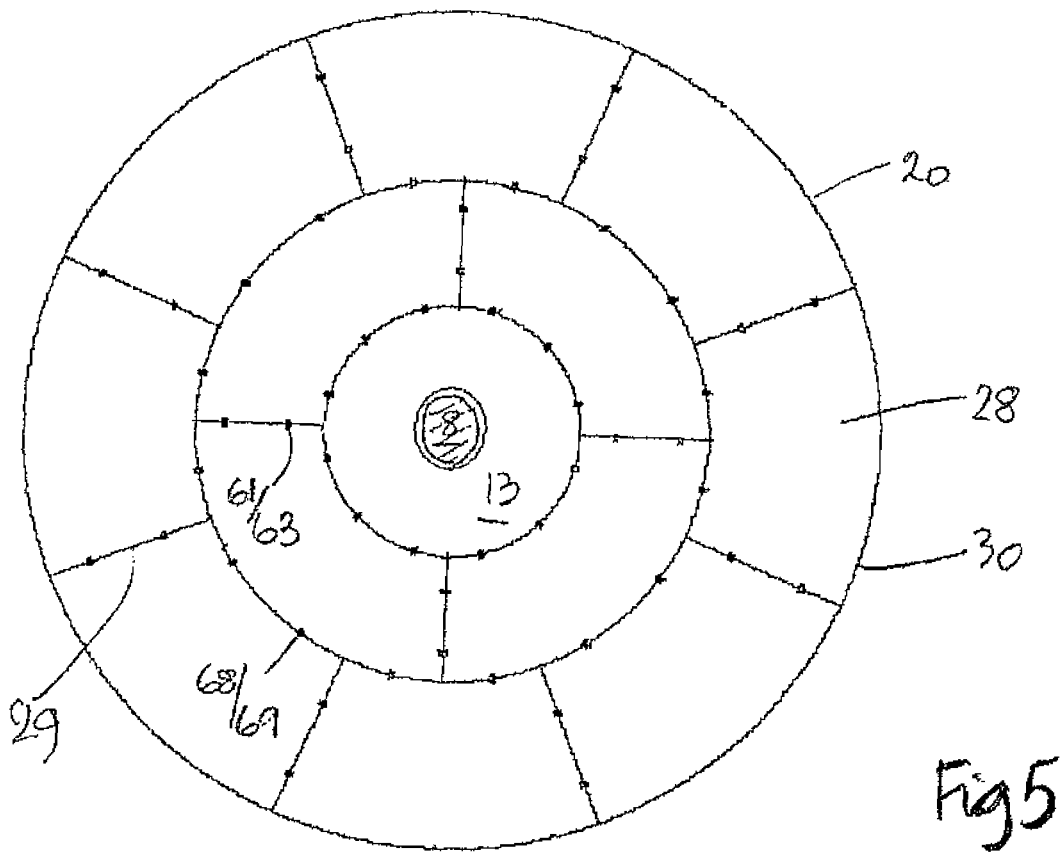
FIG. 5 is a side view of a multi-segmented disk.

Each disk assembly has a number of disks 20 (FIG. 3a). Each disk 20 has multiple concentric rings of segments 28 (FIG. 5). Each segment 28 has faces exposed to air and wastewater that are (but need not be) imperforate. Each segment 28 has:
  a. two generally radially extending edges 29; and
  b. two circumferential edges 30 that extend between the two radially extending edges 29.

The disks 20 each have
  a. a front face 31 and a back face 32 (FIG. 3a);
  b. a plurality of turbulating posts 33 (FIGS. 6-8) extending from the front 31 and back 32 faces for stirring wastewater and offering sites for adherence of biomass suspended in the wastewater;
  c. a plurality of tubular extensions 64 from the faces 31, 32. In some embodiments the extensions optionally are tubular or frusto-conical so as to define a flow channel 74 between tubular extensions 64 from and across opposing faces 31, 32 of a disk 20, the tubular extensions 64 having tips and a height of the tip that exceeds the height of the posts 33 so that adjacent disks in an assembly of a stage 12, 16, 18 are connected and spaced apart by a mating relationship between tips of facing extensions 64 and by the rotatable shaft 8; and
  d. first (e.g., male) 63 and second (e.g., second) 61 engagement features ("snap-fit connections") also extending from edge regions of one of the front 31 and back 32 surfaces of a disk 20 that enable adjacent segments 28 of a disk 20 to be joined. Optionally, the first 63 and second 61 engagement features can be separated after engagement to facilitate field repair and replacement of a segment 28 of a disk 20.

In preferred embodiments, any of the disks 20 may be made of a thermoplastic material. Their diameter can be sized up to about 15 feet. Other embodiments may assume different diameters, such as but not limited to 6 and 3 feet.

In one embodiment (FIG. 2), the three stages 12, 16, 18 of media are presented. This provides an efficient way to clean wastewater before an operator disposes of an effluent in a river or pond or for irrigation.

Figure 2:
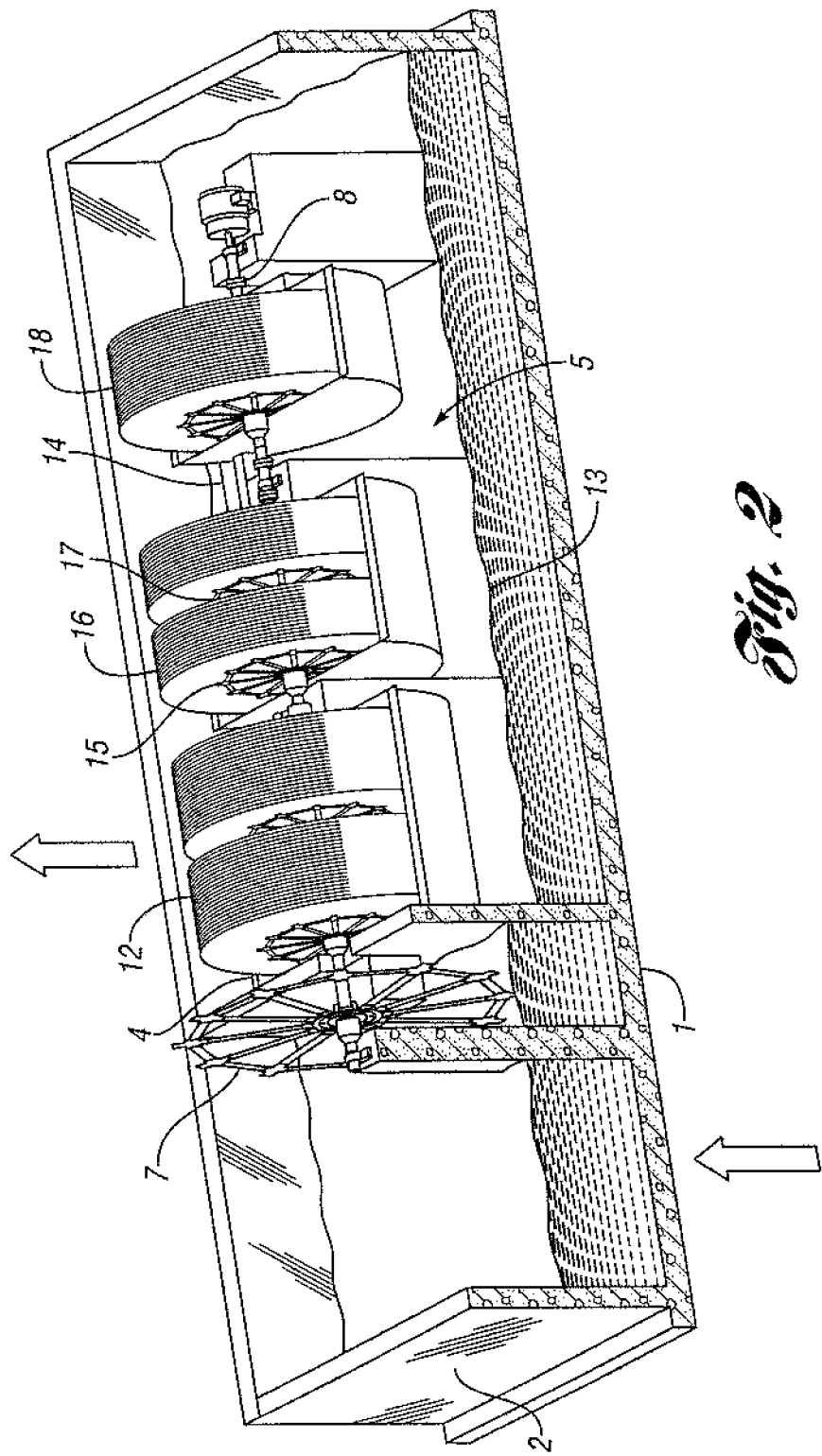
FIG. 2 is a partially sectioned, perspective view of a rotating biological contactor ("RBC") system, in accordance with one embodiment of the present disclosure.

It will be appreciated that the number of stages 12, 16, 18 is variable. In FIGS. 2-3, only three are depicted. It will be appreciated that additional (or fewer) stages may be deployed if desired. FIGS. 2-3 depict two disk assemblies in the first stage 12, two disk assemblies in the second stage 16, and only one disk assembly 18 in the third stage. The number of disks in an assembly may lie between two and about 99.

Turning now to FIG. 5, it will be appreciated that an exemplary disk 20 may be formed from multiple concentric rings 34 of segments 28. In FIG. 5, for example, there are three rings. The inner ring has a bore that receives the rotating shaft 8. In an intermediate ring (in the depicted embodiment) 4 segments are joined to the inner ring and the outer ring segments (8 in number). In one embodiment, one or more disks 20 lie in a plane with a topography that is substantially flat or curved (bulges) with an axis of symmetry that is parallel to the longitudinal axis A-A. Preferably, the curved topography lies in the inner ring 34 adjacent to the shaft 8.

Optionally, the turbulating posts 33 may droop or be bent downwardly in response to biomass weight so that the biomass may slough off the disks 20. Alternatively, one or more of the turbulating posts 33 may be formed as a fin-like projection that may move in relation to the wastewater in a knife-like manner. If a longer edge of the knife-like post embodiment is presented to the wastewater, other things being equal, more turbulence will result. Conversely, if a sharper edge surface of the knife is positioned at the leading edge of the post as it moves in relation to ambient wastewater, the post will cleave through the wastewater, leave little turbulence in its wake, and be expected to have a longer useful life.

Figure 4:
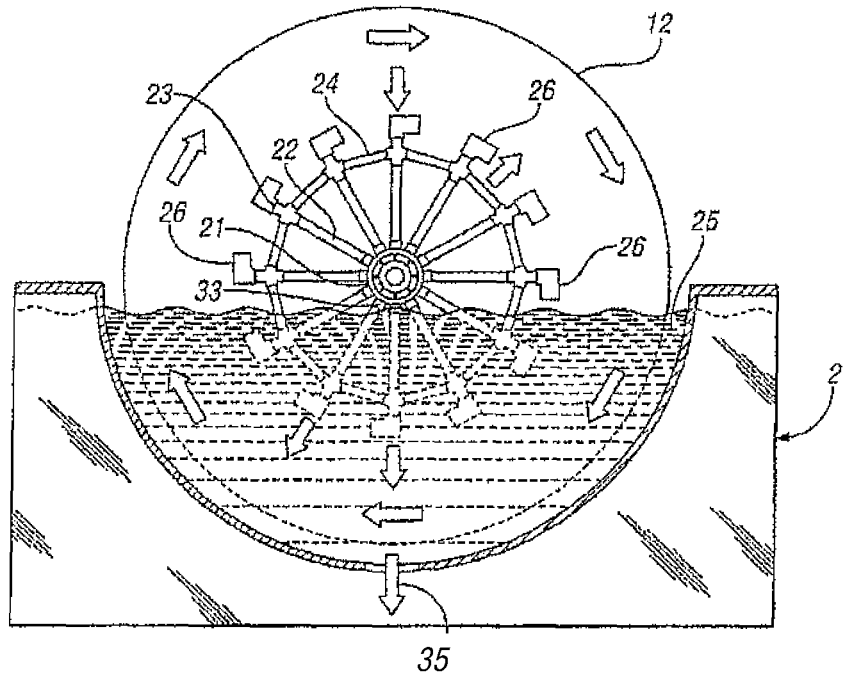
FIG. 4 is a left side elevational view thereof.

Turning now primarily to FIGS. 3-4, the RBC includes a wastewater inlet 4 and fluid outlet 6. In one embodiment, wastewater flows into a semi-cylindrical trough that induces the wheel 7 and the scoops 26 to add air to a stage. A dead biomass dump 35 is positioned below one or more stages 12, 16, 18 of the RBC. The wastewater mixing and oxidation wheel 7, which may or may not be octagonal, is mounted on the rotatable shaft 8 and has one or more cups 26 that scoop the wastewater to promote agitation and oxygenation. It will be appreciated that in FIG. 4 only eight such scoops 26 are shown. Alternatively, more or fewer scoops 26 could be provided on the wheel 7. If desired, the inclination of the scoops 26 in relation to the radially extending spokes of the wheel can be changed so as to influence when and where in their rotational path the air pockets retained in a scoop escape as they rotate through the wastewater.

Upon emerging from the fluid outlet 6 of the RBC, the fluid may pass to a secondary settling tank, filter tank, and perhaps to an ultraviolet disinfection unit for deducting clean water to a river, pond or underground.

Each stage 12, 16, 18 optionally has different surface areas for processing waste. Generally, the first stage 12 is coarse, a second stage 16 is medium and a third 18 includes a fine filter. The surface area becomes more dense as the waste passes through the stages from first to second to third stage.

The disclosed RBC offers a significant increase in the surface area of media banks exposed to the wastewater as compared to conventional media stacked systems. The disclosure provides an overall surface area exposure of 100 to 135 square feet per cubic feet of media in its initial stage. Turbulating posts and interconnecting tubes offer a high surface area for the growth of biomass, which is 3.5 to 5 times more than the surface area of conventional plastic corrugated, formed media, screen or flat media.

In one example, a disk having an outside diameter of 12 feet was constructed from an innermost monolithic disk, intermediate, and outer rings of segments. Respectively (as depicted in FIG. 5) outside the innermost primary disk there are 4 and 8 segments in the intermediate and outer rings. In the inner ring there were 100,000-240,000 turbulating posts and between 400-900 mating extensions. In the intermediate ring, there were between 120,000-300,000 turbulating posts and 500-900 mating extensions. In the outer ring, there were 160,000-320,000 turbulating posts and 600-1,100 mating extensions.

In one exemplary disk assembly the average spacing between adjacent disks was about 1.75 inches. It will be appreciated that the spacing between the turbulating posts is selected so as to increase the surface area available for biomass attachment while minimizing any tendency of the biomass to bridge between adjacent posts.

One major advantage of this process is that it is simple and energy-efficient. The installation is cost competitive with other systems. However, the major cost advantages lie in its low energy requirements during operation. Output efficiency may be in the range of 3½ to 5 times that of conventional flat plastic media. The biological effectiveness of the process makes it attractive compared to current technology that does not optimize bacteria growth, nor utilize the biomass effectively.

Because individual segments of a disk can be mated by use of the snap fit connections 68, 69 (FIGS. 6-7), subassembly and field replacements are quite straight-forward because the segments are light in weight, unlike prior art assembly steps. For example, U.S. Pat. No. 4,549,692 discloses large subassemblies that are put together in a factory and then transported to the field for installation at the point of use. In some circumstances, such practices may be cumbersome.

Figure 6:
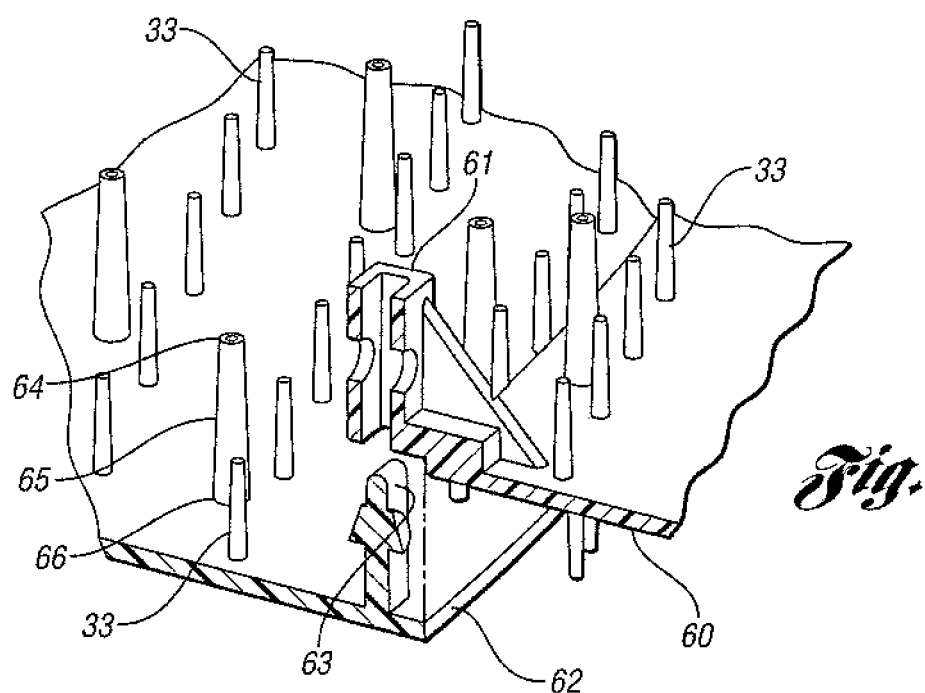
FIG. 6 is a quartering perspective view of two adjoining segments in a multi-segmented disk assembly, showing snap fit features therebetween for securing projecting elements of adjacent disk segments in place, in accordance with one embodiment of the present disclosure.
Figure 7:
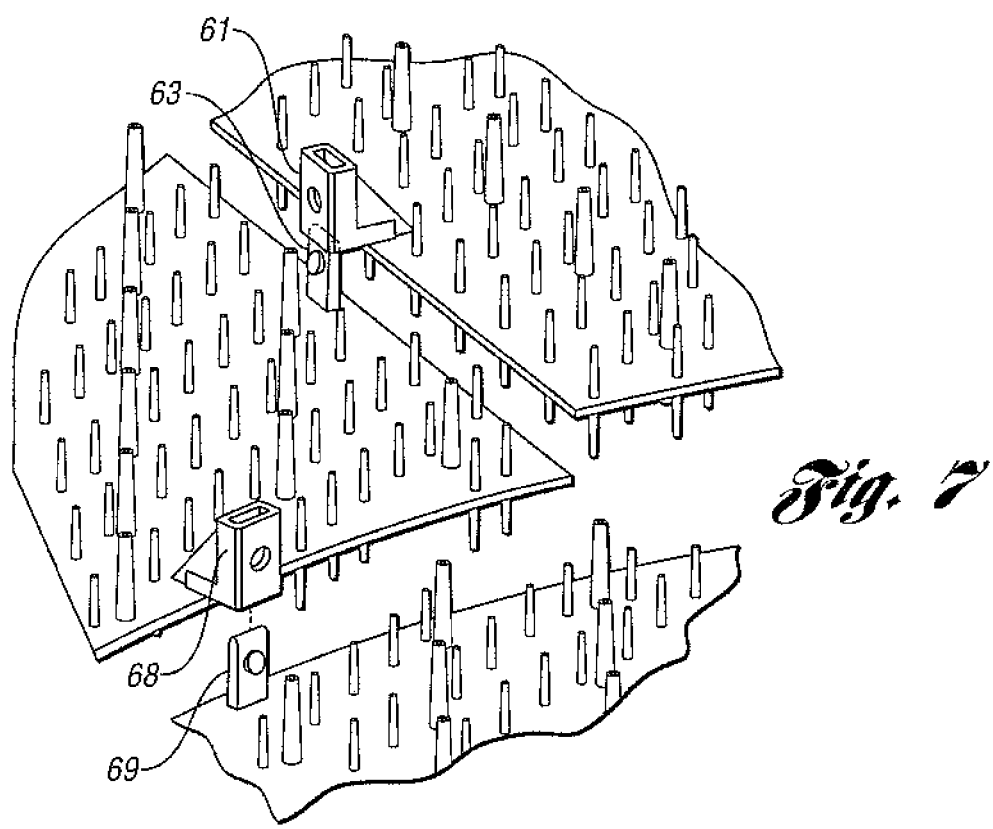
FIG. 7 is a quartering perspective view of three juxtaposed segments before being snap-fitted together.
Figure 8:
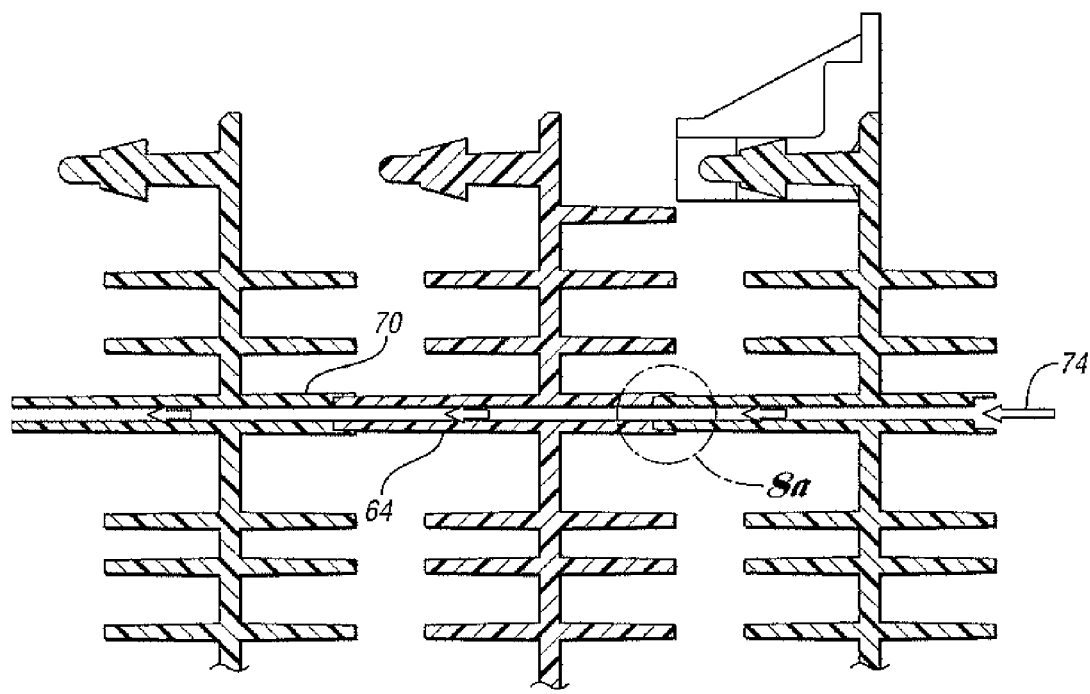
FIG. 8 is a sectional view of three connected disks showing an optional through-bore (water passage) that extends through interfitted connecting elements.

FIGS. 6-7 depict the snap fit cooperative connection 68, 69 in more detail. It will be appreciated that in some embodiments, the second connection 68 may include a tapered channel so that progressive insertion of the first connector 69 may be met by an interference fit. Optionally, a lug may extend from either the first or the second member and be received in the other member so that when the insertion step is complete, a positive engagement or registration action occurs.

By following the practices disclosed herein, assembly of the disks 20 is accomplished without deploying any metal parts. This represents an advantage over several prior art practices in which any magnetic particles in wastewater may be attracted to conventional RBC media. Absent magnetic attraction, biomass can be easily detached from the inventive RBC media without reducing the productive surface area.

Thus, the inventive media offer a strong self-supporting RBC in which a given disk 20 is formed by, for example, three concentric rings 34 of segments 28 that are connected by snap fitting features 61, 63 that are positioned at spaced apart locations (e.g. 2 per edge) on the edge regions of disk segments.

Figure 8A:
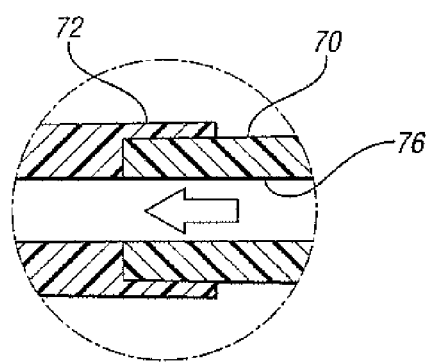
FIG. 8a is an enlargement of a portion of FIG. 8.
Figure 9:
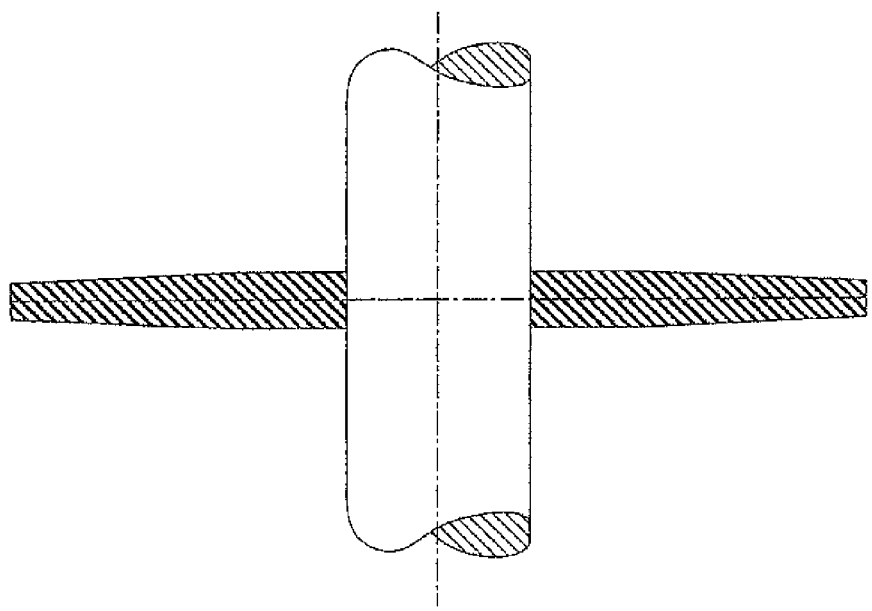
FIG. 9 is a cross-sectional view of a monolithic innermost disk segment illustrating an exemplary curved topography.

It will be appreciated that the optional hollow tubes 70 (FIGS. 8, 8a) allow water to be transmitted therethrough. At the ends of a stage, jets of water may slough off the dead biomass. This tends to avoid excessive buildup and promote circulation adjacent to the center of a disk 20 in proximity to the rotating shaft 8.

Because each assembly tends to be somewhat rigid in its structure, the disclosed RBC supports varying weights of biological buildups. This tends to prolong the useful life of the apparatus and reduce the incidence of shaft failure.

List of Reference Numerals

| Ref. No. | Component |
|---|---|
| 1 | RBC system |
| 2 | Concrete or steel tank |
| 3 | Primary settling tank |
| 4 | Fluid inlet |
| 5 | Water |
| 6 | Processed water outlet |
| 7 | Wastewater mixing & oxidation wheel |
| 8 | Rotating shaft |
| 9 | Speed reducer gear box |
| 10 | Electric motor to rotate the media shaft |
| 11 | Power saver inverter drive |
| 12 | $1^{st}$ stage |
| 13 | Fluid transfer pipe from 1st stage to $2^{nd}$ stage |
| 14 | Fluid transfer pipe from $2^{nd}$ stage to $3^{rd}$ stage |
| 15 | Front side load transfer and assembly mechanism |
| 16 | $2^{nd}$ stage |
| 17 | Rear side load transfer and assembly mechanism |
| 18 | $3^{rd}$ stage |
| 19 | Secondary settling tank |
| 20 | Disk |
| 21 | Load transfer mechanism connector pin |
| 22 | Media load transfer tube section ("wheel spoke") |
| 23 | Load transfer shaft coupling |
| 25 | Effluent treatment tank |
| 26 | Media coupling water & air mixer ("scoop" or "cup") |
| 28 | Disk segment |
| 29 | Radial edge of segment |
| 30 | Arcuate or circumferential edge |
| 31 | Front face of disk |
| 32 | Back face of disk |
| 33 | Turbulating posts |
| 34 | Rings of segments |
| 35 | Dump |
| 36 | Trough |
| 60 | Disk thickness-$1^{st}$ segment |
| 61 | Snap fit second (e.g., female) engagement feature |
| 62 | Disk thickness-$2^{nd}$ segment |
| 63 | Snap fit first (e.g., male) engagement feature |
| 64 | Connecting member (tall pin) |
| 66 | Connecting member (tall pin) |
| 68 | Snap fit second (e.g., female) engagement feature |
| 69 | Snap fit first (e.g., male) engagement feature |
| 70 | Tall pin tip section |
| 72 | Receiving tip configuration |
| 74 | Flow channel |
| 76 | Tall pin and bottom pin through-passage |

As required, detailed embodiments of the present disclosure are set forth herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A wastewater treatment facility with one or more rotating biological contactors, comprising:
   a tank;
   a rotatable shaft within the tank;
   one or more stages for purifying incoming wastewater, at least one of the one or more stages being oriented transversely to the rotatable shaft and having one or more disk assemblies, each disk assembly having a number of disks, at least some of the disks comprising one or more concentric rings of segments disposed around an innermost monolithic primary disk, at least some of the segments outside the innermost primary disk being provided with:
      two generally radially extending edges;
      two circumferential edges that extend between the two radially extending edges;
      a first snap fit engagement feature extending from a side of a segment; and
      a second snap fit engagement feature extending from a side of another segment that enables adjacent segments of a disk to be fastened and thus cooperate to form at least a portion of a disk;
   at least some of the disks also having:
      a front face and a back face;
      a plurality of turbulating posts extending from the front and back faces for agitating wastewater and offering surfaces to which microorganisms may attach for consuming contaminants from the wastewater and degrading the microorganisms;
      a plurality of connecting extensions extending from the front and back faces, the extensions having heights that exceed a height of the plurality of turbulating posts so that adjacent disks in a disk assembly are connected and spaced apart by a mating relationship between the connecting extensions.

2. The wastewater treatment facility according to claim 1, wherein one or more of the disks comprise a thermoplastic material.

3. The wastewater treatment facility according to claim 1, wherein one or more of the disks have a diameter up to about 15 feet.

4. The wastewater treatment facility according to claim 1, wherein one or more of the disks have a diameter up to about 6 feet.

5. The wastewater treatment facility according to claim 1, wherein one or more of the disks have a diameter up to about 3 feet.

6. The wastewater treatment facility according to claim 1, wherein there are 3 stages.

7. The wastewater treatment facility according to claim 1, wherein the one or more stages comprise a first and a second stage that each have two disk assemblies and a third stage that has one disk assembly.

8. The wastewater treatment facility according to claim 1, wherein the number of disks in a disk assembly is 2-99.

9. The wastewater treatment facility according to claim 1, wherein the innermost monolithic primary disk has a bore that receives the rotating shaft, one or more intermediate rings with segments that are joined to the innermost monolithic primary disk and an outer ring of segments that are connected to the intermediate ring.

10. The wastewater treatment facility according to claim 1, wherein one or more disks lie in a plane having a topography that is substantially flat or curved with an axis of symmetry that is coincident with that of the rotatable shaft.

11. The wastewater treatment facility according to claim 10, wherein a curved topography lies substantially in the innermost monolithic primary disk.

12. The wastewater treatment facility according to claim 1, wherein the posts curve downwardly in response to forces exerted by the biomass so that the biomass may slough off the disks.

13. The wastewater treatment facility of claim 1, wherein the one or more stages comprise:
   a first stage which treats active microorganisms and sludge so that the microorganisms attach themselves to a surface of a disk in a disk assembly in the first stage, multiply, form a biomass, and feed off contaminants using oxygen provided by ambient air;
   a second stage that houses microorganisms including biodegradable trace elements and other contaminates;
   a third stage in which ammonia and nitrogen comprise a majority of biodegradable contaminates remaining; and
   a fourth stage in which a majority of the microorganisms include nitrifiers.

14. The wastewater treatment facility of claim 1 wherein wastewater treated in a first stage enters a second stage for additional cleaning and to a third stage to remove impurities and flows to a secondary settling tank before ducting clean water to a river, pond or underground.

15. An RBC, comprising:
   a tank;
   a rotatable shaft;
   one or more stages for purifying incoming wastewater, at least one of the one or more stages being oriented transversely to the rotatable shaft and having one or more disk assemblies, each disk assembly having a number of disks, at least some of the disks comprising an innermost monolithic primary disk surrounded by one or more concentric rings of segments, at least some of the segments outside the innermost primary disk being provided with:
      two generally radially extending edges;
      two circumferential edges that extend between the two radially extending edges;
      a first cooperative engagement feature extending from a side of a segment; and
      a second cooperative engagement feature extending from a side of another segment that enables adjacent segments of a disk to be fastened and thus cooperate to form at least a portion of a disk:
   at least some of the disks also having:
      a front face and a back face;
      a plurality of turbulating posts extending from the front and back faces for agitating wastewater and offering surfaces to which microorganisms may attach for consuming contaminants from the wastewater and degrading the microorganisms;
      a plurality of connecting members extending from the front and back faces of a disk, the connecting members having heights that exceed the height of the plurality of turbulating posts so that adjacent disks in a disk assembly are connected and spaced apart by a mating relationship between the connecting members.

16. A method for purifying wastewater in a wastewater treatment facility, comprising the steps of:
   providing the rotating biological contactor with a rotatable shaft;
   assembling a disk having an innermost monolithic disk surrounded by segmented rings of disks with snap-fitting adjacent segments;

assembling multiple disks to form a disk assembly;

combining one or more disks assemblies together to form one or more stages in the rotating biological contactor and mounting such stages on the rotatable shaft so that the rotatable shaft may rotate the each disk in the disk assembly;

communicating wastewater influent into the rotating biological contactor;

providing one or more stages on the rotatable shaft, one or more of the one or more stages being provided with a waterwheel that includes cups that scoop ambient air into wastewater, thereby promoting oxygenation and fluid agitation;

permitting ambient air to react with microorganisms included in the wastewater so that a biofilm is formed on the disks in the disk assemblies, the biofilm metabolizing organic materials contained in the wastewater; and removing excess solids that are sloughed off from the disk assemblies following turbulence and chemical reaction, thereby purifying the incoming wastewater.

\* \* \* \* \*